(12) United States Patent
Li et al.

(10) Patent No.: US 10,863,308 B2
(45) Date of Patent: Dec. 8, 2020

(54) ASSISTANCE DATA TRANSMISSION METHOD, DEVICE, AND SYSTEM

(71) Applicant: Huawei Technologies Co., Ltd., Shenzhen (CN)

(72) Inventors: Chenwan Li, Beijing (CN); Yinghui Yu, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,366

(22) Filed: Nov. 4, 2019

(65) Prior Publication Data

US 2020/0068348 A1 Feb. 27, 2020

Related U.S. Application Data (63) Continuation of application No. PCT/CN2017/083355, filed on May 5, 2017.

(51) Int. Cl.
*H04W 4/02* (2018.01)
*H04W 4/024* (2018.01)
*G01S 5/02* (2010.01)

(52) U.S. Cl.
CPC .......... *H04W 4/023* (2013.01); *G01S 5/0236* (2013.01); *H04W 4/024* (2018.02)

(58) Field of Classification Search
CPC ...... H04W 4/023; H04W 4/024; G01S 5/0236
See application file for complete search history.

(56) References Cited

U.S. PATENT DOCUMENTS

| | | | | |
|---|---|---|---|---|
| 7,668,554 | B2 * | 2/2010 | Chang | G01S 19/05 340/539.13 |
| 8,174,438 | B2 * | 5/2012 | Fan | G01S 5/0072 342/357.42 |
| 2002/0145974 | A1 * | 10/2002 | Saidi | H04L 49/153 370/230 |
| 2002/0155850 | A1 * | 10/2002 | Haartsen | H04L 1/0057 455/502 |
| 2006/0223549 | A1 | 10/2006 | Chang | |

(Continued)

FOREIGN PATENT DOCUMENTS

| | | |
|---|---|---|
| CN | 102149070 A | 8/2011 |
| CN | 102164340 A | 8/2011 |

(Continued)

OTHER PUBLICATIONS

Orange, et al., "A-GNSS in UTRAN", 3GPP TSG RAN WG2—RAN2#57, R2-070907, Revised R2-070589, Feb. 12-16, 2007, 102 Pages, Saint Louis, US.

Orange, et al., "Presentation Paper (draft) for introducing A-GNSS concept to extend A-GPS to include GALILEO (LCS3)", 3GPP TSG RAN WG2—RAN2#54, R2-062059, Aug. 1-28, 2006, 8 Pages, Tallinn, Estonia.

(Continued)

*Primary Examiner* — Julio R Perez
(74) *Attorney, Agent, or Firm* — Slater Matsil, LLP (57) ABSTRACT

An assistance data transmission method, a device, and a system are provided. The method includes: obtaining, by a network device, assistance data from a positioning data center; and sending the assistance data to a terminal device in a broadcast manner, where the assistance data is data used by the terminal device to perform positioning. The assistance data is broadcast to the terminal device in the broadcast manner.

14 Claims, 5 Drawing Sheets

(56) References Cited

U.S. PATENT DOCUMENTS

| | | | |
|---|---|---|---|
| 2011/0039576 A1* | 2/2011 | Prakash | G01S 5/0236 455/456.1 |
| 2011/0133984 A1* | 6/2011 | Davis, III | G01S 5/0236 342/357.64 |
| 2011/0200024 A1 | 8/2011 | Karaoguz et al. | |
| 2013/0223626 A1 | 8/2013 | Edge et al. | |
| 2013/0252630 A1 | 9/2013 | Edge et al. | |
| 2016/0029162 A1 | 1/2016 | Edge et al. | |

FOREIGN PATENT DOCUMENTS

| | | |
|---|---|---|
| CN | 103765927 A | 4/2014 |
| CN | 104796982 A | 7/2015 |
| RU | 2477022 C2 | 2/2013 |
| WO | 2011019917 A1 | 2/2011 |

OTHER PUBLICATIONS

3rd Generation Partnership Project;Technical Specification Group Radio Access Network; Evolved Universal Terrestrial Radio Access (E-UTRA); LTE Positioning Protocol (LPP) (Release 14), 3GPP TS 36.355 V14.0.0 (Dec. 2016), 151 pages.

3rd Generation Partnership Project; Technical Specification Group Radio Access Network; Evolved Universal Terrestrial Radio Access (E-UTRA); Radio Resource Control (RRC); Protocol specification (Release 14) 3GPP TS 36.331 V14.2.2 (Apr. 2017), 721 pages.

3rd Generation Partnership Project; Technical Specification Group Radio Access Network; Evolved Universal Terrestrial Radio Access (E-UTRA); LTE Positioning Protocol A (LPPa) (Release 13), 3GPP TS 36.455 V13.1.0 (Mar. 2016), 61 pages.

* cited by examiner

ASSISTANCE DATA TRANSMISSION METHOD, DEVICE, AND SYSTEM

CROSS-REFERENCE TO RELATED APPLICATIONS

This application is a continuation of International Application No. PCT/CN2017/083355, filed on May 5, 2017, the disclosure of which is hereby incorporated by reference in its entirety.

TECHNICAL FIELD

This application relates to the field of communications technologies, and in particular, to an assistance data transmission method, a device, and a system.

BACKGROUND

A global positioning system (GPS) is a high-precision positioning and navigation system. Due to impact of a satellite clock error, an ephemeris error, and an ionospheric error, precision of approximately 15 meters can be implemented by using this method, and a requirement of an application scenario such as an unmanned aerial vehicle, smart driving, or a vertical market cannot be met. Then, a carrier phase difference (RTK) technology is brought in, to effectively improve positioning precision.

Figure 1:
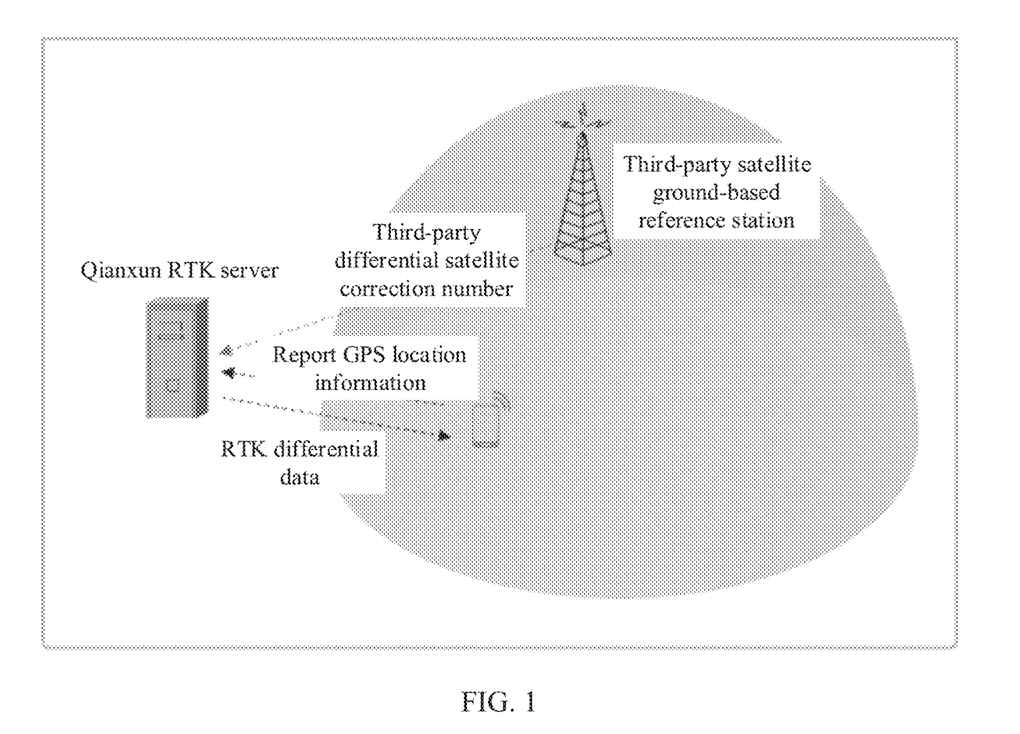
FIG. 1 is a schematic diagram of an existing principle of implementing terminal device positioning by using an RTK server.

FIG. 1 is a schematic diagram of an existing principle of implementing terminal device positioning by using an RTK server. The RTK server obtains reference data, namely, a third-party differential satellite correction number by using a third-party satellite ground-based reference station. A terminal device that needs to perform positioning needs to report GPS location information of the terminal device, and then the RTK server calculates an RTK correction number based on the received reference data and the GPS location information reported by the terminal device, and sends the RTK correction number to the terminal device. The terminal device calculates a high-precision location by using the RTK correction number and the obtained GPS location information.

It can be learned that, in an existing RTK positioning technology, the terminal device needs to report the GPS location information of the terminal device, and there is a security risk problem. In addition, the RTK server transmits the RTK correction number to the terminal device in a unicast manner, and efficiency is relatively low.

SUMMARY

Embodiments of this application provide an assistance data transmission method, a device, and a system, to resolve a security risk problem and a relatively low efficiency problem that are caused because a terminal device needs to report GPS location information of the terminal device in an existing RTK positioning technology.

According to a first aspect, an assistance data transmission method is provided, including: obtaining, by a network device, assistance data from a positioning data center; and sending, by the network device, the assistance data to a terminal device in a broadcast manner, where the assistance data is data used by the terminal device to perform positioning.

After obtaining the assistance data, the network device informs the terminal device of the assistance data in the broadcast manner, thereby avoiding a disadvantage that a security risk is relatively high because a terminal reports location information of the terminal, and improving data transmission efficiency in the broadcast manner.

With reference to the first aspect, in a possible design, the obtaining, by a network device, assistance data from a positioning data center includes: obtaining, by the network device, the assistance data from the positioning data center in a segmentation manner.

In this design, the network device segments and transmits the assistance data, and can transmit data based on a resource condition of the network device, thereby optimizing system performance based on a premise that data transmission is ensured.

With reference to the first aspect, in a possible design, the obtaining, by a network device, assistance data from a positioning data center includes: obtaining, by the network device, assistance data of different positioning precision from the positioning data center; obtaining, by the network device, assistance data specific to different positioning methods from the positioning data center; or obtaining, by the network device, assistance data specific to different satellite positioning systems from the positioning data center.

In this design, the network device distinguishes different positioning precision or positioning methods or satellite positioning systems to transmit the assistance data, and can obtain the assistance data from a plurality of dimensions, thereby effectively distinguishing the assistance data.

With reference to the first aspect, in a possible design, before the obtaining, by a network device, assistance data from a positioning data center, the method further includes: sending, by the network device, a first message to the positioning data center, where the first message is used as a request to obtain the assistance data, and the first message includes size indication information and/or transmission period indication information of a packet that can be scheduled by the network device.

In this design, the network device indicates, by using the first message, the size indication information and/or the transmission period indication information of the packet that can be scheduled by the network device, thereby further helping accurately transmit the assistance data.

With reference to the first aspect, in a possible design, the obtaining, by a network device, assistance data from a positioning data center includes: obtaining, by the network device, the assistance data from the positioning data center in a segmentation manner.

In this design, the network device segments and transmits the assistance data, and can transmit data based on a resource condition of the network device, thereby optimizing system performance based on a premise that data transmission is ensured.

With reference to the first aspect, in a possible design, the sending, by the network device, the assistance data to a terminal device in a broadcast manner includes: broadcasting, by the network device, segmented assistance data by using different system information block (SIB) types; or sending, by the network device, different packets of a same SIB type to the terminal device.

With reference to the first aspect, in a possible design, the method further includes: segmenting, by the network device, the assistance data before the network device sends the assistance data to the terminal device in the broadcast manner after receiving the assistance data, where the sending, by the network device, the assistance data to a terminal device in a broadcast manner includes: broadcasting segmented assistance data by using different SIB types; or sending different packets that use a same SIB type to the terminal device.

In this design, the network device segments the assistance data, thereby reducing load of the positioning data center and improving efficiency of transmitting the assistance data.

With reference to the first aspect, in a possible design, the sending, by the network device, the assistance data to a terminal device in a broadcast manner includes: content of the assistance data broadcast by the network device to the terminal device is included in a system message and indicates a positioning method or positioning precision or a satellite positioning system of each piece of assistance data; or content of the assistance data broadcast by the network device to the terminal device is included in different packets of a same SIB type and indicates a positioning method or positioning precision or a satellite positioning system of each piece of assistance data based on a packet sequence number.

In this design, the network device distinguishes different positioning precision or positioning methods or satellite positioning systems to transmit assistance data, and can obtain the assistance data from a plurality of dimensions, thereby effectively distinguishing the assistance data.

According to a second aspect, an assistance data transmission method is provided, including: obtaining, by a positioning data center, assistance data, where the assistance data is data used by a terminal device to perform positioning; and transmitting, by the positioning data center, the assistance data to a network device.

In this design, after obtaining the assistance data, the positioning data center transmits the assistance data to the network device, thereby improving efficiency of transmitting the assistance data, avoiding reporting of location information by a terminal, and improving security.

With reference to the second aspect, in a possible design, the obtaining, by a positioning data center, assistance data includes: obtaining, by the positioning data center, the assistance data from a reference station; or calculating, by the positioning data center, the assistance data based on assistance data obtained from the reference station.

With reference to the second aspect, in a possible design, before the obtaining, by a positioning data center, assistance data, the method further includes: receiving, by the positioning data center, a first message sent by the network device, where the first message is used as a request to obtain the assistance data, and the first message includes size indication information and/or transmission period indication information of a packet that can be scheduled by the network device.

In this design, the positioning data center transmits the assistance data based on the first message, thereby helping effectively transmit the assistance data, improving transmission efficiency, and avoiding a data loss.

With reference to the second aspect, in a possible design, the transmitting, by the positioning data center, the assistance data to a network device includes: sending, by the positioning data center, the assistance data to the network device in a segmentation manner.

In this design, the positioning data center segments and transmits the assistance data, thereby avoiding a data loss during transmission and improving data transmission security.

With reference to the second aspect, in a possible design, the method further includes: sending, by the positioning data center, system message period indication information to the network device, where the system message period indication information indicates a system message transmission period to be used by the network device.

With reference to the second aspect, in a possible design, the transmitting, by the positioning data center, the assistance data to a network device includes: transmitting, by the positioning data center, assistance data of different positioning precision to the network device by using different fields or different messages; transmitting, by the positioning data center, assistance data of different positioning methods to the network device by using different fields or different messages; or transmitting, by the positioning data center, assistance data of different satellite positioning systems to the network device by using different fields or different messages.

In this design, the assistance data is transmitted by distinguishing different positioning precision or different positioning methods or different satellite positioning systems, so that the assistance data is distinguished and transmitted.

According to a third aspect, a network device is provided, including: a receiving module, configured to obtain assistance data from a positioning data center; and a sending module, configured to send, in a broadcast manner, the assistance data obtained by the receiving module to a terminal device, where the assistance data is data used by the terminal device to perform positioning.

With reference to the third aspect, in a possible design, the receiving module is specifically configured to: obtain the assistance data from the positioning data center in a segmentation manner.

With reference to the third aspect, in a possible design, when obtaining the assistance data from the positioning data center, the receiving module is specifically configured to: obtain assistance data of different positioning precision from the positioning data center; obtain assistance data specific to different positioning network devices from the positioning data center; or obtain assistance data specific to different satellite positioning systems from the positioning data center.

With reference to the third aspect, in a possible design, the sending module is further configured to: before the receiving module obtains the assistance data from the positioning data center, send a first message to the positioning data center, where the first message is used as a request to obtain the assistance data, and the first message includes size indication information and/or transmission period indication information of a packet that can be scheduled by the network device.

With reference to the third aspect, in a possible design, the receiving module is specifically configured to: obtain the assistance data from the positioning data center in a segmentation manner.

With reference to the third aspect, in a possible design, the sending module is specifically configured to: broadcast segmented assistance data by using different system information block (SIB) types; or send different packets that use a same SIB type to the terminal device.

With reference to the third aspect, in a possible design, the network device further includes a processing module, and the processing module is specifically configured to: segment the assistance data before the sending module broadcasts the assistance data to the terminal device after the receiving module receives the assistance data, where the sending module is specifically configured to: broadcast segmented assistance data by using different SIB types; or send different packets that use a same SIB type to the terminal device.

With reference to the third aspect, in a possible design, the assistance data sent by the sending module to the terminal device in the broadcast manner is used to indicate a positioning network device or positioning precision or a satellite positioning system of each piece of assistance data in a system message; or the assistance data sent by the sending module to the terminal device in the broadcast manner is included in different packets of a same SIB type and indicates a positioning method or positioning precision or a satellite positioning system of each piece of assistance data based on a packet sequence number.

According to another aspect, in the foregoing embodiment, an entity device corresponding to the processing module may be a processor, an entity device corresponding to the sending module may be a transmitter, and an entity device corresponding to the receiving module may be a receiver.

According to a fourth aspect, a positioning server is provided, including: a processing module, configured to obtain assistance data, where the assistance data is data used by a terminal device to perform positioning; and a sending module, configured to transmit the assistance data obtained by the processing module to a network device.

With reference to the fourth aspect, in a possible design, the processing module is specifically configured to: obtain the assistance data from a reference station; or calculate the assistance data based on assistance data obtained from the reference station.

With reference to the fourth aspect, in a possible design, the positioning server further includes a receiving module, and the receiving module is configured to: before the processing module obtains the assistance data, receive a first message sent by the network device, where the first message is used as a request to obtain the assistance data, and the first message includes size indication information and/or transmission period indication information of a packet that can be scheduled by the network device.

With reference to the fourth aspect, in a possible design, the sending module is specifically configured to: send the assistance data to the network device in a segmentation manner.

With reference to the fourth aspect, in a possible design, the sending module is further configured to: send system message period indication information to the network device, where the system message period indication information indicates a system message transmission period to be used by the network device.

With reference to the fourth aspect, in a possible design, when transmitting the assistance data to the network device, the sending module is specifically configured to: transmit assistance data of different positioning precision to the network device by using different fields or different messages; transmit assistance data of different positioning methods to the network device by using different fields or different messages; or transmit assistance data of different satellite positioning systems to the network device by using different fields or different messages.

According to another aspect, in the foregoing embodiment, an entity device corresponding to the processing module may be a processor, and an entity device corresponding to the sending module may be a transmitter.

According to a fifth aspect, an assistance data transmission method is provided, including: receiving, by a terminal device, assistance data sent by a network device in a broadcast manner, where the assistance data is data used by the terminal device to perform positioning; and performing, by the terminal device, positioning by using the assistance data.

In this design, the terminal obtains the assistance data in the broadcast manner to implement positioning of the terminal, thereby avoiding periodic reporting of location information, avoiding a security risk, and reducing power consumption of the terminal device in the broadcast manner.

With reference to the fifth aspect, in a possible design, the receiving, by a terminal device, assistance data sent by a network device in a broadcast manner includes: receiving, by the terminal device, segmented assistance data broadcast by the network device by using different system information block (SIB) types; or receiving segmented assistance data sent by the network device by using different packets of a same SIB type.

With reference to the fifth aspect, in a possible design, content of the assistance data that is received by the terminal device and that is sent by the network device in the broadcast manner is included in a system message and indicates a positioning method or positioning precision or a satellite positioning system of each piece of assistance data; or content of the assistance data that is received by the terminal device and that is sent by the network device in the broadcast manner is included in different packets of a same SIB type and indicates a positioning method or positioning precision or a satellite positioning system of each piece of assistance data based on a packet sequence number.

In this design, the assistance data is transmitted by distinguishing different positioning precision or different positioning methods or different satellite positioning systems, so that the assistance data is distinguished and transmitted. The terminal device may obtain required assistance data, thereby reducing power consumption of the terminal device.

According to a sixth aspect, a terminal device is provided, including: a receiving module, configured to receive assistance data sent by a network device in a broadcast manner, where the assistance data is data used by the terminal device to perform positioning; and a processing module, configured to perform positioning by using the assistance data.

With reference to the sixth aspect, in a possible design, the receiving module is specifically configured to: receive segmented assistance data broadcast by the network device by using different system information block (SIB) types; or receive segmented assistance data sent by the network device by using different packets of a same SIB type.

With reference to the sixth aspect, in a possible design, content of the assistance data that is received by the receiving module and that is sent by the network device in the broadcast manner is included in a system message and indicates a positioning method or positioning precision or a satellite positioning system of each piece of assistance data; or content of the assistance data that is received by the receiving module and that is sent by the network device in the broadcast manner is included in different packets of a same SIB type and indicates a positioning method or positioning precision or a satellite positioning system of each piece of assistance data based on a packet sequence number.

According to another aspect, in the foregoing embodiment, an entity device corresponding to the processing module may be a processor, and an entity device corresponding to the receiving module may be a receiver.

According to a seventh aspect, a communications system is provided, and the communications system includes the network device, the positioning server, and the terminal device in the foregoing embodiments.

According to an eighth aspect, a computer storage medium is provided, configured to store a computer software instruction used by the foregoing network device. The computer software instruction includes a program designed for executing the foregoing aspects.

According to a ninth aspect, a computer storage medium is provided, configured to store a computer software instruction used by the foregoing positioning data center. The computer software instruction includes a program designed for executing the foregoing aspects.

According to a tenth aspect, a computer storage medium is provided, configured to store a computer software instruction used by the foregoing terminal device. The computer software instruction includes a program designed for executing the foregoing aspects.

DETAILED DESCRIPTION OF ILLUSTRATIVE EMBODIMENTS

The following clearly and describes the technical solutions in the embodiments of this application with reference to the accompanying drawings in the embodiments of this application.

The term "and/or" in the embodiments of this application describes only an association relationship for describing associated objects and represents that three relationships may exist. For example, A and/or B may represent the following three cases: Only A exists, both A and B exist, and only B exists. In addition, the character "/" in the embodiments of this application generally indicates an "or" relationship between the associated objects.

The following further illustrates the embodiments of this application in detail with reference to the accompanying drawings of this specification.

It should be understood that an assistance data transmission method in the embodiments of this application is applicable to a long term evolution (Long Term Evolution, LTE) system, such as an NB-IoT system. In addition, the assistance data transmission method in the embodiments of this application is also applicable to another wireless communications system, such as a global system for mobile communications (GSM), a mobile communications system (UMTS), or a code division multiple access (CDMA) system. In addition, the assistance data transmission method in the embodiments of this application is further applicable to a subsequent evolved system that uses the LTE system, such as a fifth generation 5G system.

Figure 2:
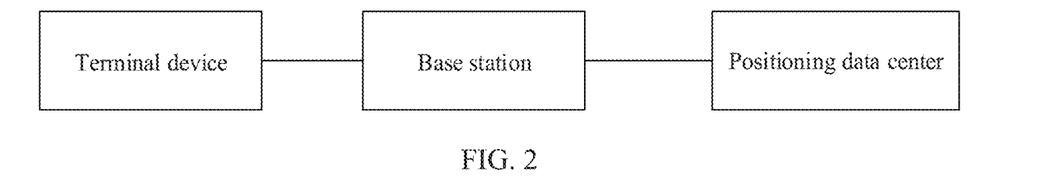
FIG. 2 is a diagram of a network architecture according to an embodiment of this application.

FIG. 2 is a diagram of a network architecture according to an embodiment of this application. The network architecture includes a terminal device, a base station, and a positioning data center. For a specific connection relationship, refer to FIG. 2.

The base station in this embodiment of this application may be configured to perform two-way conversion between a received over-the-air frame and an Internet protocol (IP) packet, and serve as a router between a wireless terminal device and another part of an access network. The another part of the access network may include an IP network. In addition, the base station in this embodiment of this application may further coordinate attribute management of an air interface. For example, the base station in this embodiment of this application may be a base transceiver station (BTS) in a global system for mobile communications (GSM) or code division multiple access (CDMA), or may be a NodeB in wideband code division multiple access (WCDMA), or may be an evolved NodeB (evolutional Node B, eNB or e-NodeB) in LTE, or may be new radio (NR) in a fifth generation 5G system. This is not limited in this embodiment of this application.

The terminal device in the embodiments of this application may refer to a device that provides a user with voice and/or data connectivity, a handheld device with a wireless connection function, or another processing device connected to a wireless modem. The terminal device may be a wireless terminal device. The wireless terminal device may communicate with one or more core networks by using a radio access network (RAN). The wireless terminal device may be a mobile terminal device, such as a mobile phone (also referred to as a "cellular" phone) or a computer with a mobile terminal device. The computer with a mobile terminal device, for example, may be a portable, a pocket-sized, a handheld, a computer built-in, or an in-vehicle mobile apparatus, which exchanges voice and/or data with the radio access network. For example, the wireless terminal device may further be a device such as a personal communication service (PCS) phone, a cordless telephone set, a session initiation protocol (SIP) phone, a wireless local loop (WLL) station, or a personal digital assistant (PDA). The wireless terminal device may also be called a system, a subscriber unit, a subscriber station, a mobile station, a mobile console, a remote station, an access point, a remote terminal device, an access terminal device, a user terminal device, a user agent, a user device, or user equipment (UE).

A positioning data center in this embodiment of this application may include a positioning server, such as an evolved serving mobile location center (E-SMLC), a gateway mobile location center (G-MLC), and another server such as an RTK server (also referred to as a control center or a computing center), and the RTK server or the control center is a server configured to calculate a correction number. The positioning server and the RTK server may be two independent entities, or may be integrated together. An interface that needs to be standardized or a private interface may be defined between the positioning server and the RTK server. In this application, the positioning server and the RTK server are considered as an integrated entity, and are referred to as the positioning data center herein. In other words, if the two servers are two independent entities or there is a newly defined interface between the two servers, when data is transmitted, the data is sent by the RTK server to the positioning server, and the data is sent by the positioning server to the base station. When data is received, a reverse process is performed.

A network device mentioned in the embodiments of this application may be a base station, an access point, or a device in communication with a wireless terminal by using one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may coordinate attribute management of the air interface. For example, the base station may be a base station (BTS, Base Transceiver Station) in GSM or CDMA, or may be a base station (NodeB) in WCDMA, or may be an evolved NodeB (eNB or e-NodeB, evolutional Node B) in LTE, which is not limited in this application.

For ease of description, an example in which the network device in the embodiments of this application is a base station is used for description. This is merely an example in the embodiments of this application, and this application includes but is not limited to the example.

In the embodiments of this application, the network device receives assistance data from the positioning data center, and broadcasts the assistance data to the terminal device. The assistance data is data used by the terminal device to perform positioning. Because a requirement that the terminal device periodically reports location information of the terminal device is avoided, a security risk of the terminal device is reduced to some extent. Because the assistance data is sent to the terminal device in a broadcast manner, efficiency of transmitting the assistance data is improved, and lifetime of a battery in the terminal device is extended.

Embodiments of this application provide an assistance data transmission method, a device, and a system, to resolve a problem of how to transmit data by using an existing RTK positioning technology in combination with an existing cellular network. The method and an apparatus are based on a same inventive concept. Because problem-resolving principles of the method and the apparatus are similar, two-way reference may be made to apparatus implementation and method implementation. No repeated description is provided again.

Figure 3:
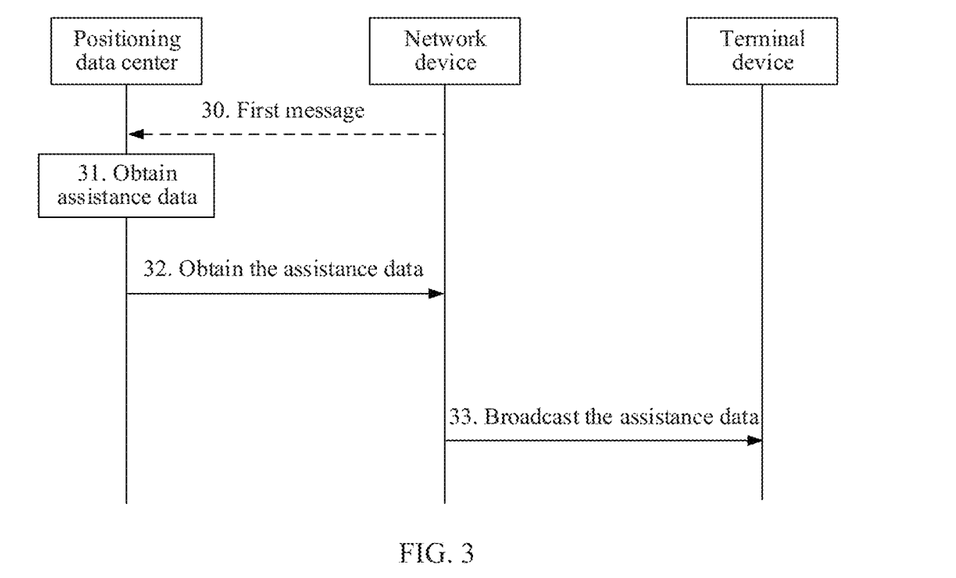
FIG. 3 is a schematic flowchart of an assistance data transmission method according to an embodiment of this application.

FIG. 3 is a schematic flowchart of an assistance data transmission method according to an embodiment of this application. A procedure may be specifically implemented by using hardware, software programming, or a combination of software and hardware.

A function module configured to perform the assistance data transmission solution provided in this embodiment of this application may be specifically implemented by using hardware, software programming, and a combination of software and hardware. The hardware may include one or more signal processing circuits and/or application-specific integrated circuits.

As shown in FIG. 3, the procedure specifically includes the following processing processes.

Step 31: A positioning data center obtains assistance data, where the assistance data is data used by a terminal device to perform positioning.

It should be noted that the assistance data may include at least one of the following data: reference station location information, an original measurement value or a correction value of a reference station, RTK data, real-time kinematic pseudorange difference (RTD) data, ionospheric data, other data such as ephemeris data, a correction number calculated by the positioning data center, and assistance data of some other cellular positioning methods, for example, assistance data of an observed time difference of arrival (OTDOA).

Specifically, when obtaining the assistance data, the positioning data center may obtain the assistance data by performing the following processes.

S1. The positioning data center obtains reference data from a reference station.

S2. Calculate data based on the reference data and location information of a network device.

S3: The positioning data center generates data based on a location of a target network device.

Optionally, before step 31 is performed, the method further includes step 30. Step 30: The positioning data center receives a first message sent by the network device, where the first message is used as a request to obtain the assistance data.

The first message may be an LTE positioning protocol annex (LPPa) message, and the first message includes size indication information and/or transmission period indication information of a packet that can be scheduled by the network device. For example, the first message may include content of a size of a schedulable SIB packet, namely, a transport block size (TBS) of a SIB or an upper limit of the transport block size of the SIB, or a system message (SI) period or a system message transmission interval. The system message period or the system message transmission interval may be an SI period or a system message transmission interval at which the network device plans to perform transmission, or may be one or more SI periods or system message transmission intervals supported by the network device.

Step 32: The network device obtains the assistance data from the positioning data center.

Specifically, when transmitting the assistance data, the positioning data center may send the assistance data to the network device by using a second message. The second message may be an LPPA message, or the second message may be an assistance data response message or a provide assistance data message.

A transmission frequency of the correction number may be considered as 1 Hz, and in a test, usually, a packet with a size of approximately 1 to 2 Kbyte is transmitted per second. Therefore, specifically, the positioning data center may segment, based on a transport block size of a SIB or an upper limit of a transport block size of a SIB that is supported by the network device, a large packet for transmission. That is, the positioning data center may segment, based on the transport block size of the SIB, the assistance data for transmission.

Therefore, when sending the second message to the network device, the positioning data center may carry a packet sequence number of each piece of segmented assistance data, and indicate whether the packet is a last packet, and the like.

Optionally, the positioning data center sends system message period indication information to the network device, where the system message period indication information indicates a system message transmission period to be used by the network device. For example, an SI period or a system message transmission interval may be sent to the network device based on a quantity of segments into which the assistance data is segmented, so that the network device can broadcast the assistance data in a timely manner. For example, the network device completes transmission within 1 second.

For example, when a packet of assistance data obtained by the positioning data center at a specific moment is relatively large, for example, in a software upgrade scenario, the positioning data center may instruct the network device to perform transmission by using a relatively small SI transmission period. For example, a relatively small SI period or system message transmission interval is carried, or one piece of indication information used to instruct the network device to use the relatively small SI period or system message transmission interval is carried, so that the network device can broadcast a large packet in a timely manner.

Specifically, when sending the assistance data to the network device, the positioning data center may send a packet each time at a size of data allowed to be transmitted on one SIB block. In this case, for a message format of the second message, refer to Table 1. Alternatively, a list may be used, so that a divided packet is sent to the network device in a form of the list. In this case, for a message format of the second message, refer to Table 2.

TABLE 1

IE/Group name (Group Name)
Message type (Message Type)
LPPA transaction/procedure identifier (Transaction ID)
Assistance data (Assistance Data)

TABLE 2

IE/Group name (Group Name)
Message type (Message Type)
LPPA transaction/procedure identifier (Transaction ID)
Assistance data list (Assistance Data List)

Further, if a packet of assistance data is relatively small, the assistance data does not need to be segmented or divided, and may be directly sent to the network device.

Specifically, when the positioning data center transmits the assistance data to the network device, there may be the following cases:

Case 1: The positioning data center transmits assistance data of different positioning precision to the network device by using different fields or different messages.

Case 2: The positioning data center transmits assistance data of different positioning methods to the network device by using different fields or different messages.

When the positioning data center sends the assistance data to the network device, different positioning precision and positioning methods may be distinguished. Different positioning precision is also corresponding to different positioning methods. For example, in an RTD method, submeter-level positioning precision may be implemented. In an RTK method, centimeter-level positioning precision may be implemented. There may also be another positioning method, such as a position difference, a pseudorange difference, phase smoothing, a carrier phase difference, local area differential GPS, wide area differential GPS, virtual reference station (VRS) technology network RTK, media access control (MAC) network RTK, area correction parameter (FKP) network RTK, a network pseudorange phase difference (Real Time DGPS, RTD) method. These different positioning methods may be corresponding to different positioning precision. Therefore, when sending the assistance data to the network device, the positioning data center needs to distinguish and send the assistance data. For example, the positioning data center sends the assistance data by using different messages. For example, the positioning data center sends the assistance data by using different fields in a message.

Table 3 illustrates an example in which different fields are used, to distinguish network RTD and network RTK, in an LPPA message for transmitting assistance data.

TABLE 3

IE/Group name (Group Name)
Message type (Message Type)
LPPA transaction/procedure identifier (Transaction ID)
RTD assistance data (Assistant Data)
RTK assistance data (Assistant Data)

Case 3: The positioning data center transmits assistance data of different satellite positioning systems to the network device by using different fields or different messages.

When the positioning data center sends the assistance data to the network device, different satellite positioning systems may be distinguished. Existing satellite positioning systems include GPS of the United States, GLONASS of Russia, Galileo of Europe, a Beidou satellite navigation system of China, and a related augmentation system, such as WAAS (wide area augmentation system) of the United States, EGNOS (European geostationary navigation overlay service) of Europe, and MSAS (Multi-functional Satellite Augmentation System) of Japan.

After the foregoing different precision, different positioning methods, or different satellite navigation systems are distinguished, the foregoing segmentation transmission method may also be used. For example, data in a specific positioning method or a specific positioning navigation system is segmented, thereby ensuring that the data can be transmitted by using a system message.

Specifically, when the network device receives the assistance data from the positioning data center, there are the following two possible implementations.

In a first possible implementation, the network device obtains the assistance data from the positioning data center in a segmentation manner.

In a second possible implementation, after receiving the assistance data, the network device segments the assistance data. In this case, the positioning data center does not segment large data. Instead, the network device segments the large data. The implementation further includes two manners.

1. The network device cannot read positioning assistance data, and the network device performs segmentation based on a size of a system message resource block. In this case, a specific RTCM message may be truncated, and the terminal device cannot obtain a complete last RTCM message when obtaining data.

2. The network device can read positioning assistance data information, to ensure that data is not truncated while the data is scheduled based on a resource.

In the foregoing possible implementations, that the network device receives the assistance data from the positioning data center includes: the network device obtains assistance data of different positioning precision from the positioning data center, obtains assistance data specific to different positioning methods from the positioning data center, or obtains assistance data specific to different satellite positioning systems from the positioning data center. In other words, the positioning data center sends the assistance data to the network device by distinguishing different positioning precision or positioning methods or satellite positioning systems. The network device further performs segmentation processing.

Step 33: The network device broadcasts the assistance data to the terminal device.

Specifically, when the network device broadcasts the assistance data to the terminal device, there may be the following two manners:

Manner 1: The network device broadcasts segmented assistance data by using different SIB types.

After receiving the segmented assistance data, the network device may broadcast different segmented assistance data by using different SIB types, such as a SIBX and a SIBY. Each of X and Y is a positive integer and is used to distinguish different SIB types, such as a SIB1 and a SIB2 in LTE.

Further, different SIB types may be used to transmit assistance data of different positioning precision, positioning methods, or satellite positioning systems. For example, the SIBX is used to broadcast RTK data, and the SIBY is used to broadcast RTD data.

Manner 2: When the network device sends segmented assistance data to the terminal device, different packets of a same SIB type may be used.

Herein, for example, each of the packets of the same SIB type is a SIB5, and has a specific SI period for transmission. To be specific, the SIB5 is broadcast in each SI period. Herein, the SIB5 broadcast in each SI period is one of different packets belonging to the SIB5. Therefore, the packets of the same type are denoted as packets broadcast in each transmission period or transmission interval.

Optionally, herein, for the packets of the same type, a transmission interval may also be set by the network device, and a SIB is a packet sent at the transmission interval.

Further, it may be understood that when the network device broadcasts the assistance data (by using different packets of different SIB types or the same SIB type), a type of a system message used to transmit the assistance data is different from that of another SIB, and different data is transmitted in each SI period or transmission interval. Therefore, a change in the system message (SIB) does not affect a change in a value tag of the SIB1, and the system message is not affected by a modification period.

Further, content broadcast by the network device to the terminal device is included in a system message and indicates a positioning method or positioning precision or a satellite positioning system of each piece of assistance data by using a field or an information element, or may be included in the packets of the same SIB type for distinguishing and indication, or may be included in SIBs of different SIB types for indication. Alternatively, content broadcast by the network device to the terminal device is included in different packets of the same SIB type and indicates a positioning method or positioning precision or a satellite positioning system of each piece of assistance data based on a packet sequence number.

For example, because assistance data includes different content, if data of the different content is broadcast by using a SIB block (packet), different fields or IEs in the system message may be used to indicate positioning methods or positioning precision or satellite positioning systems of different assistance data. For example, different fields are used to indicate specific positioning systems, positioning methods, or the like. If assistance data is transmitted by using different SIB blocks (packets) of a same SIB type or is broadcast by using different SIB types, assistance data of a specific positioning method or specific positioning precision or a specific satellite positioning system that is transmitted by using a specific SIB block of a specific SIB type or a specific SIB type may be specifically indicated in a SIB1. For example, RTD data transmitted by using a specific SIB block or a specific SIB type and RTK data transmitted by using some specific SIB blocks or specific SIB types may be indicated.

Alternatively, each SIB block (packet) of a specific SIB type indicates an ordinal number of the SIB block (packet), data of a specific positioning method that is transmitted by using this SIB block, a total quantity of divided SIB blocks during this data transmission, specific SIB blocks for transmitting data of different positioning precision or positioning methods or satellite positioning systems, and the like. In other words, a packet sequence number of each packet indicates a specific type of data sent by using a packet with the corresponding sequence number. Specifically, if the positioning data center or the network device divides a large piece of assistance data into n packets, and n is a positive integer, data types corresponding to sequence numbers of all packets are indicated in each packet, and the data types are distinguished based on data of positioning methods, positioning precision, satellite positioning systems, or different periods. In this way, when reading a packet, the terminal device may learn a packet in subsequent packets that is required by the terminal device.

The SIB block herein refers to different packets sent by using a same SIB type, for example, packets (MAC PDU) sent by using the SIB in each SI transmission period or transmission interval. Generally, in LTE, same content is sent by using a SIB in each SI period in a modification period. Herein, in other words, different content is broadcast in each SI period. To be specific, a packet or a SIB block is sent in each SI transmission period, and a specific ordinal number of a packet or data block may be learned by numbering these packets or SIB blocks. Herein, the packet sequence number is obtained by performing sorting and numbering when a large packet is divided before being segmented and sent. Different to-be-segmented large packets may be separately numbered after being divided, or may be numbered from 0 or 1 after being cumulatively numbered until a maximum allowed value is reached.

In another possible manner, assistance data of a common part is carried in one SIB block or a specific type of SIB, for example, a SIBX. Different assistance data of other different methods is separately transmitted, for example, by using different SIB blocks or different SIB types. The common part may be data that changes in large periods, such as ionospheric data and tropospheric data. The data may be stored alone in one SIB. The UE needs to read the data only when the data changes. This type of data may have a single value tag and/or change period. The terminal device needs to read the data only when the data changes.

In this way, after receiving all assistance data, the terminal device may demodulate the data based on a positioning method or positioning precision or a satellite positioning system supported by the terminal device, or obtain information by using a corresponding key.

For different packets of a same SIB type, specifically, after a large packet of assistance data is divided into a plurality of small packets, each packet has a packet sequence number. When broadcasting these small packets, the network device may broadcast packet sequence numbers or index values of all packets obtained by dividing the large packet, and correspondingly broadcast specific positioning precision or a specific positioning method or a specific satellite positioning system corresponding to specific sequence numbers.

For example, if a large packet is divided into five small packets, sequence numbers 1, 2, 3, 4, and 5 are broadcast in each packet, and an indication that sequence numbers 1, 2, and 3 correspond to GPS and sequence numbers 4 and 5 correspond to GLONASS is provided. In this way, if the terminal device accepts the GPS system, when reading the first packet, the terminal device learns that only packets 1, 2, and 3 need to be read, and subsequent two packets do not need to be further read. A positioning method with other positioning precision is similar.

Further, when a resource of the network device is limited, in other words, when a transport block size or an upper limit of the transport block size of the SIB that can be scheduled by the network device changes, the network device sends a third message to inform the positioning data center. The third message carries size indication information of a new schedulable packet. The size indication information may be a transport block size or an upper limit of the transport block size of the SIB. Alternatively, if the SIB cannot be sent, the network device informs the positioning data center.

The following specifically describes the foregoing method by using several embodiments.

Embodiment 1

When a positioning data center sends assistance data to a network device, different positioning precision or different positioning methods or different satellite positioning systems may be distinguished. Different positioning precision is also corresponding to different positioning methods. For example, in an RTD method, submeter-level positioning precision may be implemented. In an RTK method, centimeter-level positioning precision may be implemented. There may also be another positioning method. Therefore, when sending the assistance data to the network device, the positioning data center needs to distinguish and send the assistance data. For example, the positioning data center sends the assistance data by using different messages or different fields in a message.

After data sent by the positioning data center to the network device is distinguished based on different positioning precision or different positioning methods or different satellite positioning systems, each part of a data volume may still be very large and exceed a size of data broadcast by using the SIB. In this case, the data needs to be segmented as described above. For example, data of different precision is segmented, data of different positioning methods is segmented, and data of different satellite positioning navigation systems is segmented. An example is shown in Table 4 and Table 5.

TABLE 4

| IE/Group name (Group Name) |
| --- |
| Message type (Message Type) |
| LPPA transaction/procedure identifier (Transaction ID) |
| Segmented RTD assistance data (Assistant Data) |
| Segmented RTK assistance data (Assistant Data) |

TABLE 5

| IE/Group name (Group Name) |
| --- |
| Message type (Message Type) |
| LPPA transaction/procedure identifier (Transaction ID) |

TABLE 5-continued

| RTD assistance data list (Assistant Data list) |
| --- |
| RTK assistance data list (Assistant Data list) |

To be specific, when sending an LPPA message to the network device, the positioning data center may transmit one segment of each type of data or send only one packet of the data type each time, or may send a plurality of segmented packets together to the network device by using a data list. If one segment or one packet is transmitted each time, a plurality of messages need to be transmitted to complete transmission of a specific type of data.

Further, in step 32, content broadcast by the network device to the terminal device after the network device receives the second message is included in a system message and indicates a positioning method or positioning precision or a satellite positioning navigation system of each piece of assistance data. Alternatively, the content broadcast by the network device to the terminal device is included in different packets of a same SIB type and indicates a positioning method or positioning precision of each piece of assistance data based on a packet sequence number. A specific indication is shown above.

A manner in which the positioning data center segments and sends assistance data of different positioning precision or different positioning methods is the same as that in Embodiment 1. Details are not described herein again.

Embodiment 2

Figure 4:
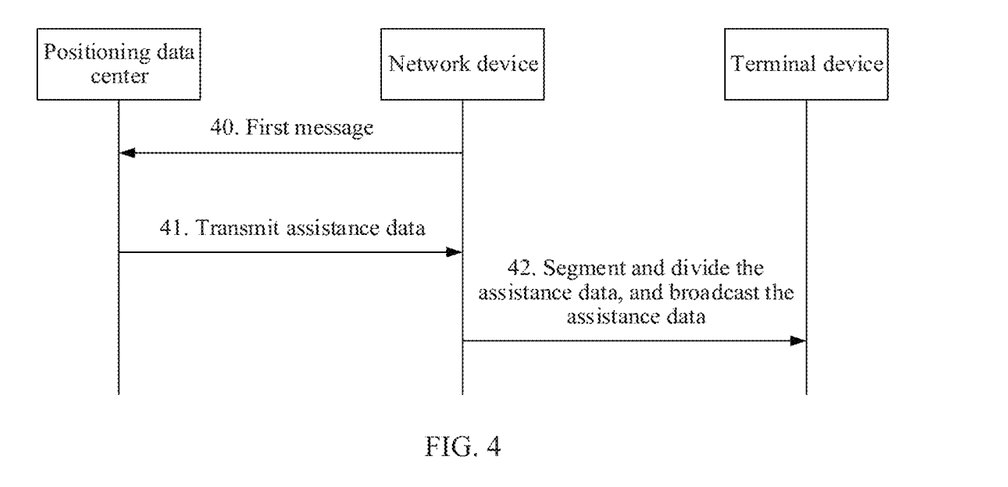
FIG. 4 is a schematic flowchart of an assistance data transmission method according to an embodiment of this application.

FIG. 4 shows a procedure of interaction between a network device and a positioning data center by using an example in which the network device segments assistance data.

Step 40: The network device sends, to the positioning data center, a first message used as a request to obtain the assistance data. Optionally, step 40 may not be performed.

Step 41: The positioning data center sends the assistance data to the network device.

Step 42: The network device segments and divides the assistance data, and broadcasts the assistance data to the terminal device.

Optionally, if the network device can read the assistance data, when the positioning data center sends the assistance data to the network device, the assistance data may not need to be segmented. When broadcasting the assistance data, the network device may distinguish the assistance data of different positioning precision or different positioning methods or different satellite positioning systems or different periods. Specifically, transmission of different types of positioning data may be scheduled and indicated by using a SIB1, or may be indicated in a SIB that is used for transmitting positioning assistance data. Different SIB types may be used for transmission, or different packets of a same SIB type may be used for transmission.

Optionally, the positioning data center may also indicate assistance data of different positioning precision or different positioning methods or different satellite positioning systems. Optionally, the positioning data center indicates and sends the assistance data to the network device by using an LPPA message, and the network device performs segmentation processing on the assistance data.

Specifically, the positioning data center or the network device distinguishes data based on data types. The data types include but are not limited to different positioning precision, different methods, and different satellite positioning navigation systems.

In addition, if positioning servers such as an E-SMLC and an RTK server (control center) are not entities, the RTK server obtains assistance data and sends the assistance data to the positioning server, such as the E-SMLC. However, the method in the foregoing embodiment may be used in an assistance data transmission procedure between the E-SMLC and UE. A specific segmentation identification entity may be the RTK server, the E-SMLC, or the network device. If the segmentation identification entity is the RTK server, the RTK server segments the assistance data and then transmits the assistance data to the E-SMLC. The E-SMLC sends the assistance data to the network device by using an LPPA message, and the network device broadcasts the assistance data to the terminal device. A specific segmentation transmission and broadcasting method may be the method in the foregoing embodiment.

Specifically, the network device divides the assistance data based on a resource scheduling condition of the network device. Each packet may also include a packet sequence number, and indicate a specific SIB transport block used for specific positioning precision, a specific positioning method, a specific satellite positioning system, or the like. This is similar to the foregoing embodiment. Details are not described herein again.

Based on a same concept, an embodiment of this application further provides a network device, and the network device is configured to perform an action or a function of the network device in the foregoing method embodiments.

Based on a same concept, an embodiment of this application further provides a positioning server, and the positioning server is configured to perform an action or a function of the positioning data center in the foregoing method embodiments.

Based on a same concept, an embodiment of this application further provides a terminal device, and the terminal device is configured to perform an action or a function of the terminal device in the foregoing method embodiments.

An embodiment of this application further provides a communications system, and the communications system includes the network device, the positioning server, and the terminal device in the foregoing embodiments.

For brevity, for content of an apparatus part, specifically refer to the method embodiment. No repeated description is provided.

Figure 5A:
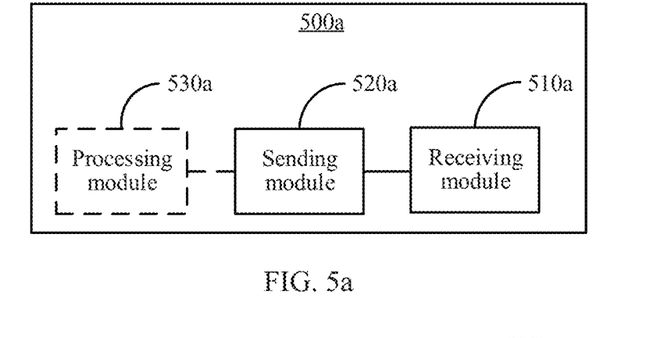
FIG. 5a is a schematic structural diagram of a network device according to an embodiment of this application.

As shown in FIG. 5a, a network device 500a in this embodiment of this application includes a receiving module 510a and a sending module 520a. The receiving module 510a is configured to obtain assistance data from a positioning data center. The sending module 520a is configured to send, in a broadcast manner, the assistance data obtained by the receiving module 510a to a terminal device, where the assistance data is data used by the terminal device to perform positioning.

Optionally, the receiving module 510a is specifically configured to: obtain the assistance data from the positioning data center in a segmentation manner.

Optionally, when obtaining the assistance data from the positioning data center, the receiving module 510a is specifically configured to: obtain assistance data of different positioning precision from the positioning data center; obtain assistance data specific to different positioning network devices from the positioning data center; or obtain assistance data specific to different satellite positioning systems from the positioning data center.

Optionally, the sending module 520a is further configured to: before the receiving module 510a obtains the assistance data from the positioning data center, send a first message to the positioning data center, where the first message is used as a request to obtain the assistance data, and the first message includes size indication information and/or transmission period indication information of a packet that can be scheduled by the network device.

Optionally, the receiving module 510a is specifically configured to: obtain the assistance data from the positioning data center in a segmentation manner.

Optionally, the sending module 520a is specifically configured to: broadcast segmented assistance data by using different system information block (SIB) types; or send different packets that use a same SIB type to the terminal device.

Optionally, the network device further includes a processing module 530a, and the processing module 530a is specifically configured to: segment the assistance data before the sending module 520a broadcasts the assistance data to the terminal device after the receiving module 510a receives the assistance data.

The sending module 520a is specifically configured to: broadcast segmented assistance data by using different SIB types; or send different packets that use a same SIB type to the terminal device.

Optionally, the assistance data sent by the sending module 520a to the terminal device in the broadcast manner is used to indicate a positioning network device or positioning precision or a satellite positioning system of each piece of assistance data in a system message; or the assistance data sent by the sending module 520a to the terminal device in the broadcast manner is included in different packets of a same SIB type and indicates a positioning method or positioning precision or a satellite positioning system of each piece of assistance data based on a packet sequence number.

Figure 5B:
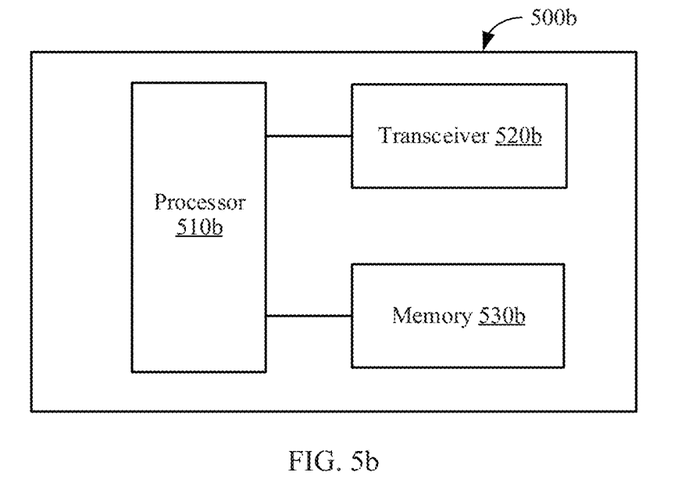
FIG. 5b is a schematic structural diagram of hardware of a network device according to an embodiment of this application.

It should be noted that, in this embodiment of this application, the processing module 530a may be implemented by a processor, and the sending module 520a may be implemented by a transceiver. As shown in FIG. 5b, a network device 500b may include a processor 510b, a transceiver 520b, and a memory 530b. The memory 530b may be configured to store code or a program pre-installed when the network device 500b is delivered from a factory, and may also store code used to be executed by the processor 510b, and the like.

The processor 510b may be a general-purpose central processing unit (CPU), a microprocessor, an application-specific integrated circuit (ASIC), or one or more integrated circuits, and is configured to perform a related operation, to implement technical solutions provided in the embodiments of this application.

It should be noted that although only the processor 510b, the transceiver 520b, and the memory 530b are shown for the network device 500b shown in FIG. 5b, in a specific implementation process, a person skilled in the art should understand that the network device 500b further includes another component necessary for normal running. In addition, according to a specific requirement, a person skilled in the art should understand that the network device 500b may further include hardware components for implementing other additional functions. In addition, a person skilled in the art should understand that the network device 500b may include only components or modules essential for implementing this embodiment of this application, but not necessarily include all the components shown in FIG. 5b.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM), or the like.

Figure 6A:
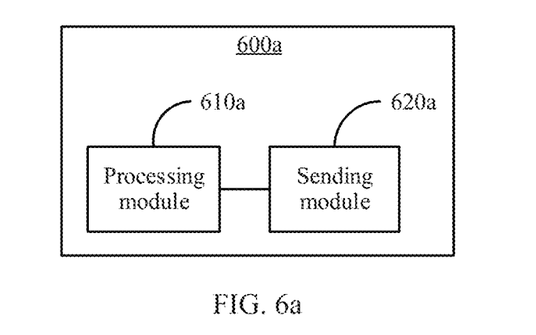
FIG. 6a is a schematic structural diagram of a positioning server according to an embodiment of this application.

As shown in FIG. 6a, a positioning server 600a in this embodiment of this application includes a processing module 610a and a sending module 620a. The processing module 610a is configured to obtain assistance data, where the assistance data is data used by a terminal device to perform positioning. The sending module 620a is configured to transmit the assistance data obtained by the processing module 610a to a network device.

Optionally, the processing module 610a is specifically configured to: obtain the assistance data from a reference station; or calculate the assistance data based on assistance data obtained from the reference station.

Optionally, the positioning server further includes a receiving module 630a, and the receiving module 630a is configured to: before the processing module 610a obtains the assistance data, receive a first message sent by the network device, where the first message is used as a request to obtain the assistance data, and the first message includes size indication information and/or transmission period indication information of a packet that can be scheduled by the network device.

Optionally, the sending module 620a is specifically configured to: send the assistance data to the network device in a segmentation manner.

Optionally, the sending module 620a is further configured to: send system message period indication information to the network device, where the system message period indication information indicates a system message transmission period to be used by the network device.

Optionally, when transmitting the assistance data to the network device, the sending module 620a is specifically configured to: transmit assistance data of different positioning precision to the network device by using different fields or different messages; transmit assistance data of different positioning methods to the network device by using different fields or different messages; or transmit assistance data of different satellite positioning systems to the network device by using different fields or different messages.

Figure 6B:
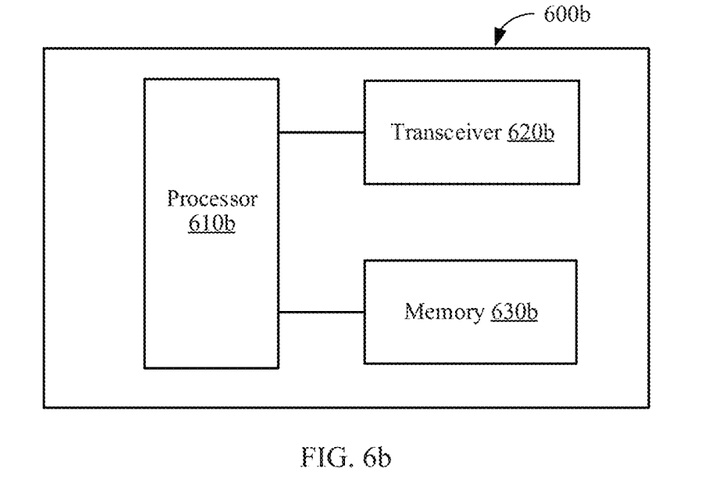
FIG. 6b is a schematic structural diagram of hardware of a positioning server according to an embodiment of this application.

It should be noted that, in this embodiment of this application, the processing module 610a may be implemented by a processor, and the sending module 620a may be implemented by a transceiver. As shown in FIG. 6b, a positioning server 600b may include a processor 610b, a transceiver 620b, and a memory 630b. The memory 630b may be configured to store code or a program pre-installed when the positioning server 600b is delivered from a factory, and may also store code used to be executed by the processor 610b, and the like.

The processor 610b may be a general-purpose CPU, a microprocessor, an ASIC, or one or more integrated circuits, and is configured to perform a related operation, to implement technical solutions provided in the embodiments of this application.

It should be noted that although only the processor 610b, the transceiver 620b, and the memory 630b are shown for the positioning server 600b shown in FIG. 6b, in a specific implementation process, a person skilled in the art should understand that the positioning server 600b further includes another component necessary for normal running. In addition, according to a specific requirement, a person skilled in the art should understand that the positioning server 600b may further include hardware components for implementing other additional functions. In addition, a person skilled in the art should understand that the positioning server 600b may include only components or modules essential for implementing this embodiment of this application, but not necessarily include all the components shown in FIG. 6b.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium may be a magnetic disk, an optical disk, a ROM, a RAM, or the like.

Figure 7A:
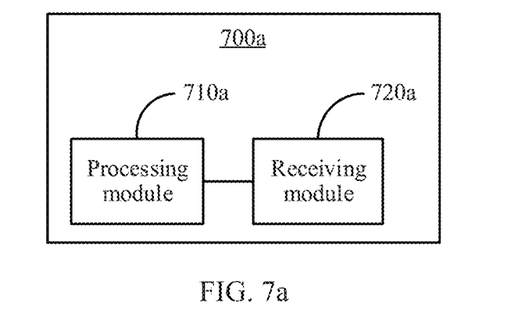
FIG. 7a is a schematic structural diagram of a terminal device according to an embodiment of this application.

As shown in FIG. 7a, a terminal device 700a in this embodiment of this application includes a receiving module 720a and a processing module 710a. The receiving module 720a is configured to receive assistance data sent by a network device in a broadcast manner, where the assistance data is data used by the terminal device to perform positioning.

The processing module 710a is configured to perform positioning by using the assistance data.

Optionally, the receiving module 720a is specifically configured to: receive segmented assistance data broadcast by the network device by using different system information block (SIB) types; or receive segmented assistance data sent by the network device by using different packets of a same SIB type.

Optionally, content of the assistance data that is received by the receiving module 720a and that is sent by the network device in the broadcast manner is included in a system message and indicates a positioning method or positioning precision or a satellite positioning system of each piece of assistance data; or content of the assistance data that is received by the receiving module 720a and that is sent by the network device in the broadcast manner is included in different packets of a same SIB type and indicates a positioning method or positioning precision or a satellite positioning system of each piece of assistance data based on a packet sequence number.

For all possible implementations of the terminal device 700a in this embodiment of this application, refer to all possible implementations of the terminal device in the embodiments of this application.

Figure 7B:
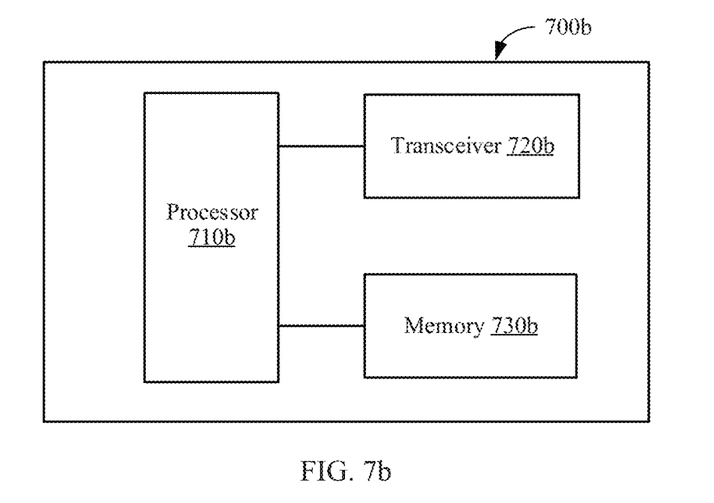
FIG. 7b is a schematic structural diagram of hardware of a terminal device according to an embodiment of this application.

It should be noted that, in this embodiment of this application, the processing module 710a may be implemented by a processor, and the receiving module 720a may be implemented by a transceiver. As shown in FIG. 7b, a terminal device 700b may include a processor 710b, a transceiver 720b, and a memory mob. The memory mob may be configured to store code or a program pre-installed when the terminal device 700b is delivered from a factory, and may also store code used to be executed by the processor 710b, and the like.

The processor 710b may be a general-purpose CPU, a microprocessor, an ASIC, or one or more integrated circuits, and is configured to perform a related operation, to implement technical solutions provided in the embodiments of this application.

It should be noted that although only the processor 710b, the transceiver 720b, and the memory mob are shown for the terminal device 700b shown in FIG. 7b, in a specific implementation process, a person skilled in the art should understand that the terminal device 700*b* further includes another component necessary for normal running. In addition, according to a specific requirement, a person skilled in the art should understand that the terminal device 700*b* may further include hardware components for implementing other additional functions. In addition, a person skilled in the art should understand that the terminal device 700*b* may include only components or modules essential for implementing this embodiment of this application, but not necessarily include all the components shown in FIG. 7*b*.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium may be a magnetic disk, an optical disk, a ROM, a RAM, or the like.

Figure 8:
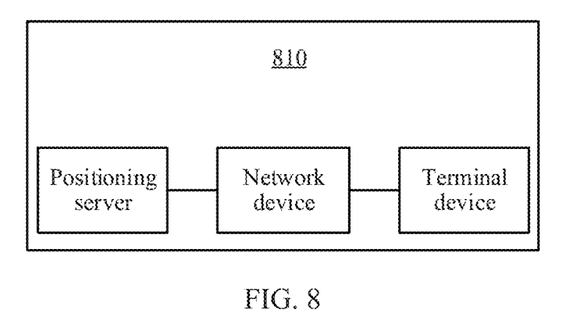
FIG. 8 is a schematic structural diagram of a communications system according to an embodiment of this application.

As shown in FIG. 8, a communications system 810 in this embodiment of this application includes any possible network device shown in FIG. 5*a* or FIG. 5*b*, any possible positioning server shown in FIG. 6*a* or FIG. 6*b*, and any possible terminal device shown in FIG. 7*a* or FIG. 7*b*.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method, comprising: obtaining, by a network device, assistance data from a positioning data center, wherein the assistance data is segmented into pieces of segmented assistance data; obtaining, by the network device from the positioning data center, a packet sequence number of each piece of segmented assistance data; obtaining, by the network device from the positioning data center, indication information indicating whether each packet corresponding to an obtained packet sequence number is a last packet; and sending, by the network device, the assistance data to a terminal device in a broadcast manner, wherein the assistance data is usable by the terminal device to perform positioning.

2. The method according to claim 1, wherein obtaining the assistance data from the positioning data center comprises:
   obtaining the assistance data of different positioning precisions from the positioning data center; or
   obtaining the assistance data specific to different positioning methods from the positioning data center; or
   obtaining the assistance data specific to different satellite positioning systems from the positioning data center; or
   obtaining the assistance data from the positioning data center in a segmentation manner.

3. The method according to claim 1, wherein sending the assistance data to the terminal device in the broadcast manner comprises:
   broadcasting the segmented assistance data using different system information block (SIB) types; or
   broadcasting different packets that use a same SIB type to the terminal device.

4. The method according to claim 1, wherein:
   content of the assistance data broadcast by the network device to the terminal device is comprised in a system message and indicates a positioning method or positioning precision or a satellite positioning system of each piece of assistance data; or
   content of the assistance data broadcast by the network device to the terminal device is comprised in different packets of a same system information block (SIB) type and indicates a positioning method or positioning precision or a satellite positioning system of each piece of assistance data based on a packet sequence number.

5. A method, comprising:
   obtaining, by a positioning data center, assistance data, wherein the assistance data is usable by a terminal device to perform positioning; and
   transmitting, by the positioning data center, the assistance data to a network device, wherein transmitting the assistance data to the network device comprises:
      sending, to the network device, a packet sequence number of each piece of segmented assistance data; and sending, to the network device, indication information indicating whether each packet corresponding to each sent packet sequence number is a last packet.

6. The method according to claim 5, wherein obtaining the assistance data comprises:
obtaining the assistance data from a reference station; or
calculating the assistance data based on assistance data obtained from the reference station.

7. The method according to claim 5, wherein before obtaining the assistance data, the method further comprises:
receiving a first message sent by the network device, wherein the first message requests to obtain the assistance data, and the first message comprises size indication information or transmission period indication information of a packet that is schedulable by the network device.

8. An apparatus, comprising:
a receiver;
a transmitter;
a processor; and
a non-transitory computer-readable storage medium storing a program to be executed by the processor, the program including instructions for:
obtaining, using the receiver, assistance data from a positioning data center, wherein the assistance data is segmented into pieces of segmented assistance data;
obtaining, from the positioning data center using the receiver, a packet sequence number of each piece of segmented assistance data; and
obtaining, from the positioning data center using the receiver, indication information indicating whether each packet corresponding to an obtained packet sequence number is a last Packet; and
sending, in a broadcast manner using the transmitter, the assistance data to a terminal device, wherein the assistance data is data usable by the terminal device to perform positioning.

9. The apparatus according to claim 8, wherein the program includes instructions for:
obtaining the assistance data of different positioning precisions from the positioning data center; or
obtaining the assistance data specific to different positioning network devices from the positioning data center; or
obtain the assistance data specific to different satellite positioning systems from the positioning data center.

10. The apparatus according to claim 8, wherein the program includes instructions for:
broadcasting segmented assistance data using different system information block (SIB) types; or
broadcasting different packets that use a same SIB type to the terminal device.

11. The apparatus according to claim 8, wherein the program includes instructions for:
broadcasting the segmented assistance data using different system information block (SIB) types; or
broadcasting different packets that use a same SIB type to the terminal device.

12. The apparatus according to claim 8, wherein:
the assistance data sent to the terminal device in the broadcast manner indicates a positioning network device or positioning precision or a satellite positioning system of each piece of assistance data in a system message; or
the assistance data sent to the terminal device in the broadcast manner is comprised in different packets of a same system information block (SIB) type and indicates a positioning method or positioning precision or a satellite positioning system of each piece of assistance data based on a packet sequence number.

13. A positioning server, comprising:
a transmitter;
a processor; and
a non-transitory computer-readable storage medium storing a program to be executed by the processor, the program including instructions for:
obtaining assistance data, wherein the assistance data is data used by a terminal device to perform positioning; and
transmitting, using the transmitter, the assistance data to a network device, wherein transmitting the assistance data to the network device comprises:
sending, to the network device using the transmitter, a packet sequence number of each piece of segmented assistance data; and
sending, to the network device using the transmitter, indication information indicating whether each packet corresponding to each sent packet sequence number is a last packet.

14. The positioning server according to claim 13, wherein the program includes instructions for: obtaining the assistance data from a reference station; or calculate the assistance data based on assistance data obtained from the reference station.

* * * * *

UNITED STATES PATENT AND TRADEMARK OFFICE
CERTIFICATE OF CORRECTION

PATENT NO. : 10,863,308 B2  
APPLICATION NO. : 16/673366  
DATED : December 8, 2020  
INVENTOR(S) : Chenwan Li Page 1 of 1

It is certified that error appears in the above-identified patent and that said Letters Patent is hereby corrected as shown below:

In the Claims

In Column 23, Line 33, Claim 8, delete "Packet" and insert --packet--.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*